United States Patent [19]

Westphal

[11] Patent Number: 4,476,384

[45] Date of Patent: Oct. 9, 1984

[54] METHOD OF AND SYSTEM FOR DETERMINING A SPECTRUM OF RADIATION CHARACTERISTICS WITH FULL COUNTING-LOSS COMPENSATION

[76] Inventor: Georg P. Westphal, Schmidlerstrasse 7, A-1238, Vienna, Austria

[21] Appl. No.: 297,770

[22] Filed: Aug. 31, 1981

[30] Foreign Application Priority Data

Sep. 1, 1980 [AT] Austria .................................. 4401/80

[51] Int. Cl.³ .......................... H01D 18/00; G01T 1/20
[52] U.S. Cl. .................................... 250/252.1; 250/369
[58] Field of Search .................... 250/252, 336, 363 R, 250/363 S, 366, 369

[56] References Cited

U.S. PATENT DOCUMENTS

| 3,814,937 | 6/1974 | Lowes | 250/336 |
| 4,058,728 | 11/1977 | Nickles | 250/363 S |
| 4,078,178 | 3/1978 | Lowes | 250/336 |
| 4,369,495 | 1/1983 | Inbar et al. | 250/363 S |

FOREIGN PATENT DOCUMENTS

1139077  1/1969  United Kingdom .

OTHER PUBLICATIONS

Westphal, G. P., "A High Rate Gamma Spectroscopy System for Activation Analysis of Short-Lived Isomeric Transitions", *Nuclear Instruments & Methods*, 136 (1976), 271–283.

Anders, "Experiences with the Ge(Li) Detector for High Resolution Gamma Ray Spectrometry and a Practical Approach to the Pulse Pile Up Problem", *Nuclear Inst. & Methods*, 68 (1969), 205–208.

Wiernik, "Normal and Random Pulse Generators for the Correction of Dead-Time Losses in Nuclear Spectrometry", *Nuclear Inst. & Methods*, 96 (1971), 325–329.

*Primary Examiner*—Janice A. Howell
*Attorney, Agent, or Firm*—Karl F. Ross

[57] ABSTRACT

Real-time correction of counting losses in the operation of a pulse-height analyzer, connected to the output of a radiation detector, is accomplished by establishing a gating interval at a time when the analyzer is available after processing the last detector pulse, this interval beginning at an instant delayed beyond the trailing edge of that last pulse by at least a predetermined rise time and ending with the leading edge of the next detector pulse. Test pulses generated during this gating interval are counted and their number is used to determine a probability ratio whose reciprocal constitutes a weighting factor; the digitized amplitude of each detector pulse addresses a corresponding memory cell whose contents are thereupon increased by the current weighting factor.

12 Claims, 5 Drawing Figures

METHOD OF AND SYSTEM FOR DETERMINING A SPECTRUM OF RADIATION CHARACTERISTICS WITH FULL COUNTING-LOSS COMPENSATION

FIELD OF THE INVENTION

My present invention relates to the spectroscopic determination of radiation characteristics and, more particularly, to a method of and means for compensating the unavoidable counting losses incurred in the operation of a so-called pulse-height analyzer receiving output pulses of a radiation detector for registering the number of occurrences of pulses of different amplitudes during a certain observation period, these pulse amplitudes being generally proportional to the energy of particles incident upon the detector from a field of radiation to which that detector is exposed. In a broader sense, however, the radiation detector to which my invention is applicable may also be a device emitting pulses whose amplitudes vary in proportion to the transit times of nuclear particles or the like traveling over a predetermined path.

BACKGROUND OF THE INVENTION

The pulse-height analyzer here contemplated comprises circuitry to which the output pulses of the detector are fed, generally after suitable amplification, and which selectively addresses the cells of a multicell memory according to the digitized pulse amplitudes. In prior spectroscopic systems the contents of any cell so addressed are incremented by a value of unity; at the end of the observation period, therefore, the several memory cells contain respective counts of incident particles pertaining to different energy levels or transit times which may be collectively referred to as "channels". These counts, however, are incomplete since pulses arriving during the so-called "dead time" of the analyzer (while a preceding pulse is still being processed) are not registered; in the absence of special precautions, moreover, the counts are affected by pile-up of closely spaced detector pulses whose overlap may cause them to merge into a single pulse with a false peak amplitude.

It has already been proposed to compensate for these counting losses by replacing the aforementioned increments of unity value with different numerical values, termed weighting factors, taking the dead time of the analyzer into account; see article by J. Harms in Vol. 53 of *Nuclear Instruments and Methods,* page 192, published 1967 by North-Holland Publishing Company of Amsterdam, Netherlands. In order to minimize the effect of pulse overlap, pile-up rejectors have been developed which prevent the analyzer from responding to more than one detector pulse at a time; such a pile-up rejector has been described, for example, in my article titled A HIGH RATE GAMMA SPECTROSCOPY SYSTEM FOR ACTIVATION ANALYSIS OF SHORT-LIVED ISOMERIC TRANSITIONS which appeared in Vol. 136 (1976) of *Nuclear Instruments and Methods,* pages 271–283. Aside from a rather complex circuitry, however, these devices depend for efficient operation on a certain pulse shape and are also susceptible to false triggering by electrical interferences.

A technique designed to correct for both dead time and pile-up uses a series of test pulses which are introduced in parallel with the detector pulses into the preamplifier of the system. The ratio of the number of test pulses registered correctly by the analyzer to the total number thereof generated during the observation period is taken as representative of the proportion of properly processed detector pulses; thus, the reciprocal value of this ratio serves as a corrective factor by which the number of events written in each memory cell at the end of the observation period must be multiplied in order to yield the true channel counts. Reference in this connection may be made to articles by M. O. Deighton and by E. J. Cohen which appeared in Vol. 14 (1961), page 48, and Vol. 25 (1974), page 25, of *Nuclear Instruments and Methods.*

A problem of this known procedure resides in the fact that, on the one hand, the test pulses are themselves a cause of counting losses and ought therefore to be widely spaced whereas, on the other hand, a high pulse cadence is desirable for a more exact determination of the corrective factor. These test pulses, moreover, originate at a common source and therefore cannot overlap so that their loss rate is not the same as that of the detector pulses which are subject to pile-up; this drawback is particularly noticeable with high pulse cadences. Furthermore, the amplitude of the test pulses should fall within a gap of the pulse-height spectrum which must be determined by a preliminary scan in advance of the actual measurement; such determination can be made only by a skilled operator and must be individually carried out in each instance, thus precluding the utilization of this technique for series examinations or with automatic equipment. Finally, an evaluation of counting losses by this method can be performed only at the end of the observation period during which the cadence of the test pulses must be held constant; the method is therefore inapplicable to the measurement of short-lived nuclear particles or of radiation sources pulsed with time-varying frequencies.

OBJECTS OF THE INVENTION

Thus, the general object of my present invention is to provide an improved method of and system for determining a spectrum of radiation characteristics, with the aid of a pulse-height analyzer receiving output pulses of a radiation detector, which obviates the aforedescribed drawbacks of prior-art techniques.

A more particular object is to provide a method of and means for real-time compensation of counting losses in such a system to facilitate a virtually instantaneous approximation of the true channel count by the value stored in each memory cell whereby even rapidly changing radiation spectra can be correctly evaluated.

SUMMARY OF THE INVENTION

In accordance with my present invention, counting losses incurred in the operation of a pulse-height analyzer in a spectrographic system of the general type referred to comprises essentially the following steps:

(a) the measuring of a busy period which begins with the appearance of an output pulse of a radiation detector and ends upon the termination of the processing of that output pulse by the associated analyzer;

(b) an extension of this busy period by an additional period corresponding to the predetermined rise time of any such output pulse, thereby establishing gating intervals which separate at least some of the busy periods so extended;

(c) generation of a train of test pulses partly coinciding with these gating intervals;

(d) a determination of the ratio of the basic frequency of the generated test pulses to the mean frequency of those test pulses which coincide with the aforementioned gating interval and which I shall term "cleared pulses" hereinafter; and (e) utilization of that ratio as a corrective parameter in evaluating the counts of occurrences of particular radiation characteristics (e.g. energy or transmit time) during a given observation period.

The detector driving the analyzer may be disposed in any field of radiant energy, including that of a pulsed radiation source (e.g. an X-ray emitter) or of gamma rays resulting from isomeric transitions. Its output pulses may be analog voltages proportional to incident radiant energy, in which case the cell-addressing circuitry of the analyzer will include an analog/digital converter, but could also be obtained in digital form from a counter measuring the transmit times of nuclear particles from a source to a target, e.g. as described in British Pat. No. 1,139,077.

In principle, with a source of radiation whose characteristics do not vary significantly throughout the observation period, the ratio determined in the foregoing step (d) may simply be used in the final step (e) as a factor by which the values stored at the end of that period in the several memory cells are multiplied—mentally or otherwise—to provide the desired true counts. Advantageously, however, this ratio is directly fed as an incremental value into each memory cell addressed by the digitized detector output and is updated either continuously or at frequent intervals (preferably on the order of milliseconds) to keep pace with any change in the radiation characteristics that are to be analyzed.

Since the test pulses generated in accordance with my invention do not pass through the preamplifier and are not registered in the memory of the pulse-height analyzer, they do not interfere with the output pulses of the detector and can recur at any desired cadence or repetition frequency without affecting the counting procedure. Advantageously, the spacing of these "virtual" test pulses is a small fraction of the extended busy period referred to above and, preferably, of the rise time forming part of that period. As the evolution of the test pulses is independent of the rise time of the detector pulses, any number of such test pulses can be generated during that rise time.

BRIEF DESCRIPTION OF THE DRAWING

The above and other features of my invention will now be described in detail with reference to the accompanying drawing in which.

SPECIFIC DESCRIPTION

Figure 1:
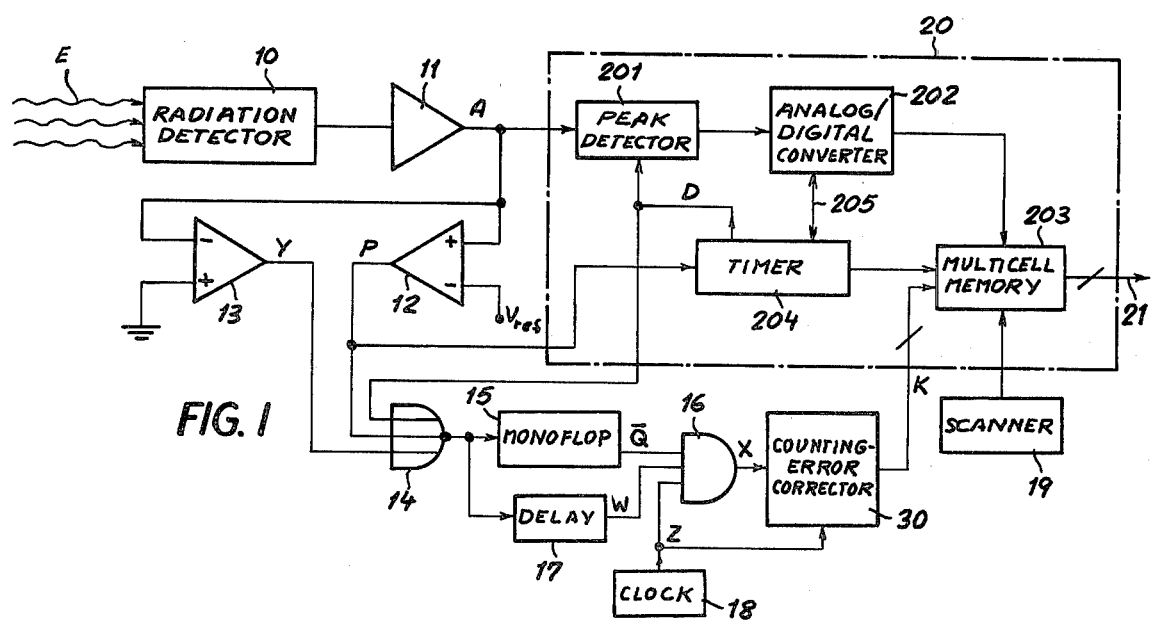
FIG. 1 is an overall block diagram of a spectroscopic system embodying my invention.

The system shown in FIG. 1 comprises a radiation detector 10 responsive to incident radiation E whose output pulses A, with amplitudes proportional to the energy of randomly arriving particles, are fed via a preamplifier 11 to a pulse-height analyzer 20. The latter includes a peak detector 201, an analog/digital converter 202 in the output of that peak detector, and a digital memory 203 with a multiplicity of cells selectively addressable by the converter output, all controlled by a timer 204. The amplified output pulses A of detector 10, assumed to be of positive polarity, are further transmitted in parallel to a noninverting input of a first threshold comparator 12 and to an inverting input of a second threshold comparator 13; comparator 12 receives on its inverting input a predetermined reference voltage $V_{ref}$, lying just above the noise level of amplifier 11, whereas the noninverting input of comparator 13 is grounded. In the presence of a detector pulse A exceeding the aforementioned noise level, comparator 12 emits a recognition pulse P; comparator 13, which is needed only when the radiation detector 10 is of a type emitting a negative transient at the tail ends of its positive output pulses A, produces an inhibiting pulse Y in the presence of such a transient.

Timer 204, when activated by the leading edge of a recognition pulse P from threshold comparator 12, emits a control pulse D whose leading edge—following that of pulse P by an interval equal to a predetermined rise time t of detector pulses A—enables the peak detector 201 to sample the amplitude of the instant detector pulse at a time when that amplitude is presumed to have attained its maximum value. This value, stored for the duration of pulse D in circuit 201, is digitized by converter 202 which is concurrently enabled by the timer. Pulses D measure a busy period sufficient for the processing of the detected peak amplitude by converter 202 and for the writing of a numerical value K from a counting-error corrector 30 in a cell of memory 203 addressed by the converter output. If the converter 202 is of a type whose processing time varies with the pulse amplitude, the duration of a pulse D may be correspondingly lengthened or foreshortened in response to signals exchanged between the converter and the timer via a two-way connection 205.

Pulses P, Y and D are fed to respective inputs of a NOR gate 14 working into a monoflop 15 normally delivering a positive voltage $\overline{Q}$ to one input of an AND gate 16. Another input of AND gate 16 is connected to the output of NOR gate 14 via a delay circuit 17; when gate 14 begins to conduct in the absence of pulses P, Y and D, it trips the monoflop 15 and generates an unblocking pulse W which reaches the gate 16 after a delay in circuit 17 sufficient to allow the monoflop to cut off its output signal $\overline{Q}$ for an additional period equaling the rise time t of detector pulses A whereby gate 16 remains blocked for an extended busy period which begins with the appearance of a recognition pulse P (substantially coinciding with a detector pulse A) and ends with the termination of the off-normal state of monoflop 15. A third input of AND gate 16 receives a train of test pulses Z, independent of pulses P, from a clock circuit 18; during intervals of conduction of gate 16, these test pulses are delivered as cleared pulses X to one input of counting-error corrector 30 which also has another input receiving all the generated test pulses Z from the clock circuit. The structure of error corrector 30 will be described hereinafter with reference to FIG. 4. Also shown in FIG. 1 is a conventional scanner 19 operable after the observation period to read out the contents of each cell of memory 203 to a suitable indicator by way of a multiple 21.

The mode of operation of the system of FIG. 1 will now be explained with reference to FIG. 2 whose first graph (a) shows several detector pulses $A_1$, $A_2$, $A_3$ of different amplitudes and with irregular spacing. Corresponding recognition pulses $P_1$, $P_2$ and $P_3$ coincide with those portions of the detector pulses that exceed the reference voltage $V_{ref}$, as shown in graph (b). Graph (c) illustrates corresponding control pulses D (here of constant duration) which are delayed relatively to these recognition pulses by the rise time t. If the system includes the ancillary threshold detector 13 of FIG. 1, its output pulses Y—disregarded in FIG. 2—may come into existence immediately after the end of each pulse P and conceivably could prolong the cutoff of NOR gate 14 beyond the trailing edges of pulses D. As indicated in graph (d), the output pulses $\overline{Q}$ of monoflop 15 disappear shortly after the trailing edges of the corresponding pulses P (with a lag d bridged by the delay line 17 of FIG. 1) for a period equal to rise time t. The time between the leading edge of any pulse P and the leading edge of the next pulse $\overline{Q}$ represents the extended busy periods B during which AND gate 16 of FIG. 1 is blocked. Depending on the separation of successive detector pulses A, these extended busy periods may or may not overlap one another; graph (e) shows several such periods B alternating with gating intervals G during which test pulses Z, graph (f), clear the AND gate 16 as pulses X shown in graph (g). It should also be noted that the peak detector 201 is inhibited by pulses D from responding to any detector pulse A, such as a pulse $A_x$ shown in phantom lines in graph (a), overlapping an earlier pulse (here $A_2$) which has triggered the generation of such a pulse D. As will be apparent, and as is obviously necessary for the obtention of a significant number of cleared pulses X, the basic frequency or cadence of test pulses Z greatly exceeds the variable recurrence frequency of output pulses P emitted by detection circuitry 10–12.

Figure 2:
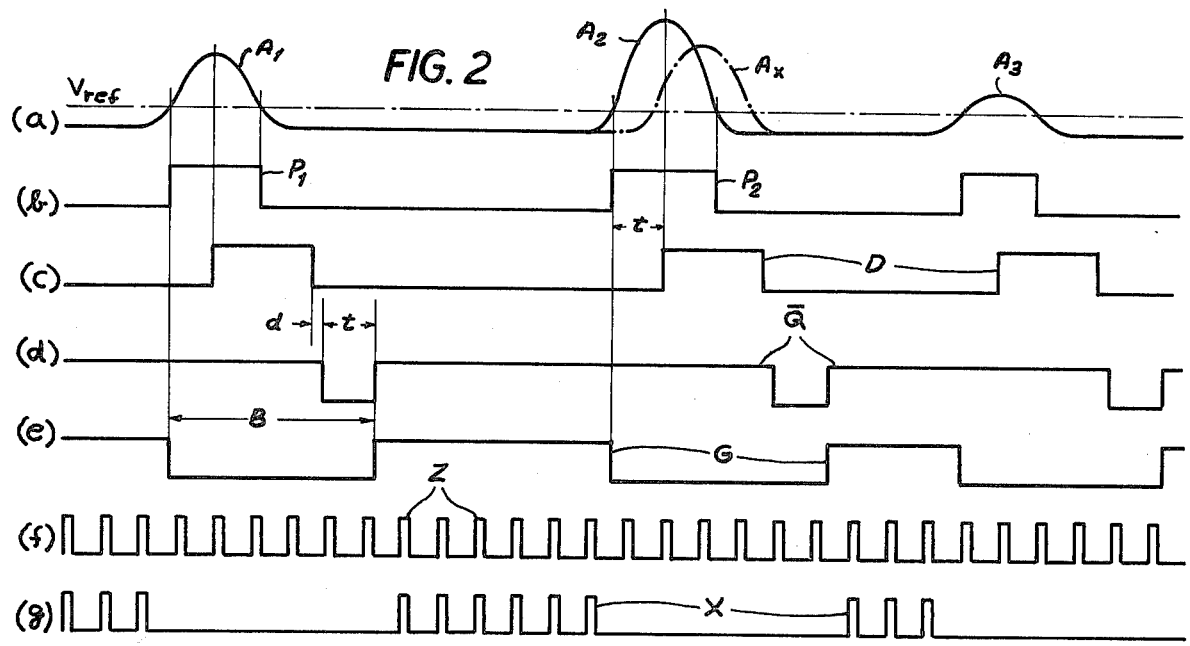
FIG. 2 is a set of graphs relating to the operation of the system of FIG. 1.

FIG. 2 further shows that a cycle of test pulses Z is less than the rise time t and that, therefore, a plurality of such test pulses occur during each extended busy period B. In a system designed for nuclear-pulse spectroscopy, a convenient test-pulse cadence will be 4 MHz. Component 30 divides this cadence by the mean frequency of the cleared pulses X to obtain the corrective parameter K. With a virtual degree of resolution established by this cadence, the total number of pulses Z generated during the observation period constitutes the number of possible events while the number of cleared pulses X constitutes the number of processable events. The quotient of the latter number divided by the former represents the probability of correct processing and is the reciprocal of the corrective parameter K generated by component 30.

Figure 3:
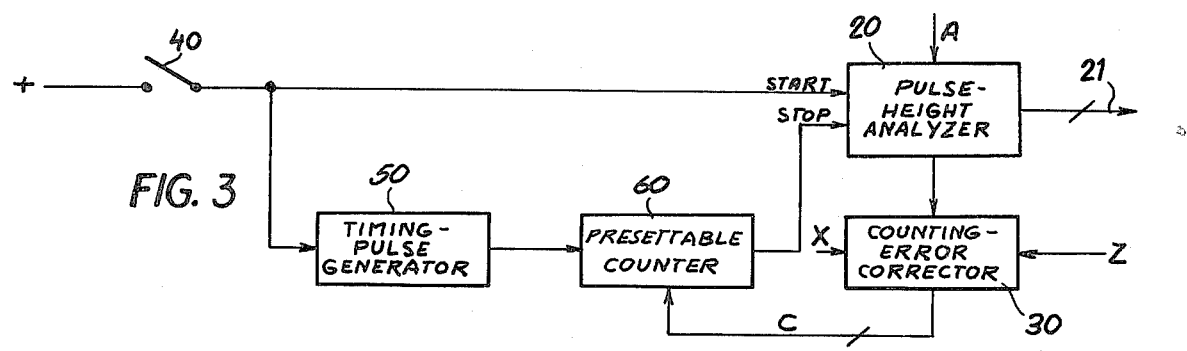
FIG. 3 illustrates means for utilizing the output of a counting-error corrector in the system of FIG. 1 in the presence of incident radiation whose characteristics do not significantly vary during an observation period.

In a situation in which the frequency ratio of pulses X and Z is expected to remain essentially constant throughout the observation period, the corrective parameter K may simply be used as a multiplier for the contents of the several memory cells read out at the end of that period. In FIG. 3 I have illustrated a system in which such multiplication is performed automatically by a lengthening of the observation period beyond its nominal duration. Thus, analyzer 20 is turned on by the energization of a starting input thereof via a switch 40, e.g. manually, with simultaneous activation of a timing-pulse generator 50 designed to measure the observation period. Pulse generator 50 steps a presettable counter 60 which stops the analyzer on reaching its maximum count; the nominal observation period will generally be a minor fraction of a complete counting cycle. Error corrector 30 may in this case include a read-only memory addressable by the value K—calculated early in the current observation period or possibly during a preceding test—to emit a preliminary count C that is to be loaded into counter 60; higher values of K call for lower values of C to increase the number of timing pulses which are to be counted. If, for example, counter 60 has a capacity of 100 pulses and the nominal observation period is 20 timing pulses from generator 50, a factor $K=3$ necessitating a tripling of that period requires a preloading of the counter by an amount $C=40$.

With the arrangement of FIG. 3 the addressed cells of memory 203 (FIG. 1) are incremented by a fixed value, e.g. 1, rather than by a variable weighting factor K.

Figure 4:
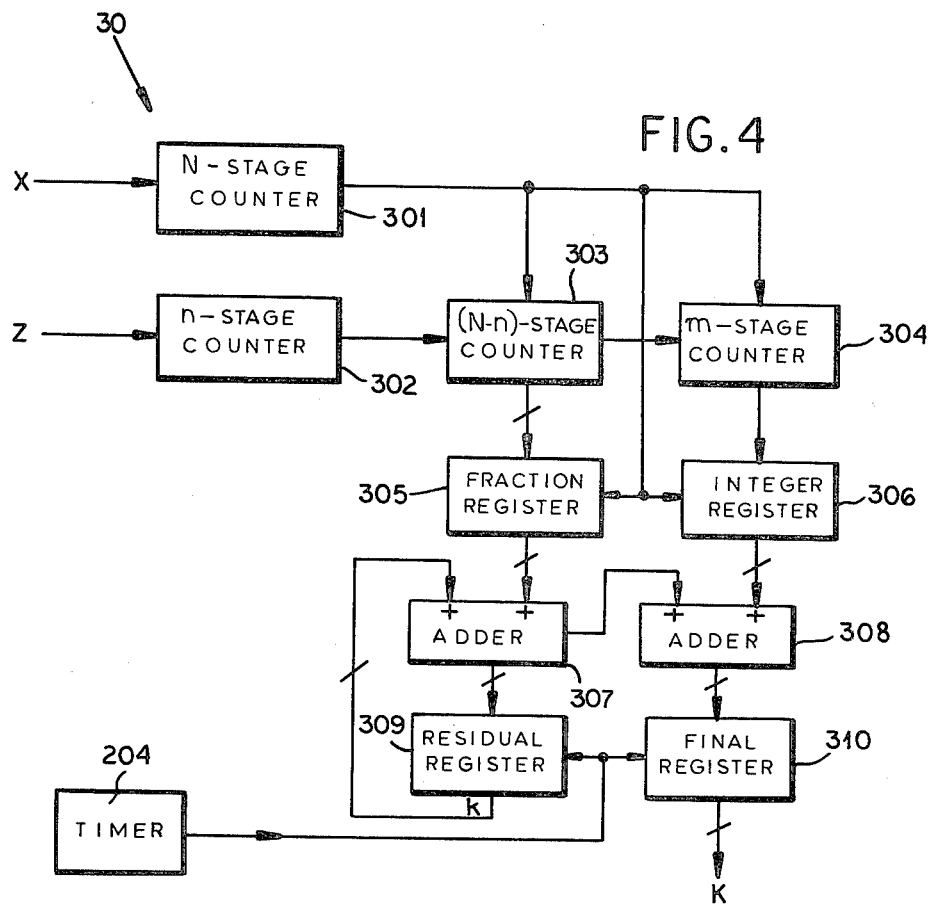
FIG. 4 shows details of an error corrector designed for a quasi-continuous counting-loss compensation.

FIG. 4 shows a preferred embodiment of error corrector 30. The cadence of cleared pulses X is stepped down by a ratio $1:2^N\equiv 1:R$ with the aid of an N-stage counter 301 acting as a frequency divider; the cadence of test pulses Z is similarly stepped down by the same ratio 1:R with the aid of two cascaded counters 302, 303 of n and N-n stages, respectively. These three pulse counters are of the cyclic type, resetting and restarting themselves upon reaching their full count. A further or main counter 304 of m stages has a stepping input connected to the output of counter 303; counters 303 and 304 have resetting inputs connected to the output of counter 301, being also able to restart immediately after being reset at that counter. Such resetting is performed by the trailing edge of an output pulse of counter 301 whose leading edge enables two registers 305, 306 to accept the reading last attained by counters 303 and 304, respectively.

The cascaded counters 302, 303 could be replaced by a single counter of N stages in a limiting case.

With counter 304 registering a whole number of pulses Z for each pulse X, registers 305 and 306 respectively contain the integral part and a fractional part of the frequency ratio of pulses Z and X as calculated upon the occurrence of any cleared pulse X. These values are updated with every $R^{th}$ pulse X, thus at intervals equal to R clock cycles multiplied by that frequency ratio. While the number m of stages of counter 304 is independent of numbers n and N, I have found a value of $m=N=8$ to be quite satisfactory; with the aforementioned test-pulse cadence of 4 MHz, this corresponds to an updating interval of 64K microseconds.

The contents of registers 305 and 306 are transferred via a pair of adders 307, 308 to two further registers 309 and 310, respectively, where they appear as a residual fractional value k and as a final integer K constituting the current weighting factor or corrective parameter. Timer 204, when activated by a new detector pulse A at the end of a gating interval G as described with reference to FIGS. 1 and 2, causes the readout of parameter K from register 310 and simultaneously enables the feedback of value k from register 309 to another input of adder 307 for summing with the fractional value received from register 305 in the next transfer phase; whenever the resulting sum equals or exceeds the amount $2^{N-n}$, a carry is transmitted from adder 307 to another input of adder 308 while any residue remaining in adder 307 is again delivered to register 309. In this way the actual frequency ratio can be more closely approached by the iteratively updated parameter K.

When the parameter K is merely utilized as a one-time multiplier, e.g. in the manner described in connection with FIG. 3, the error corrector 30 may of course be greatly simplified. Aside from combining counters 302 and 303 into a single N-stage unit, components 305-310 may then be replaced by a single register storing a single value K read out from counter 304.

Figure 5:
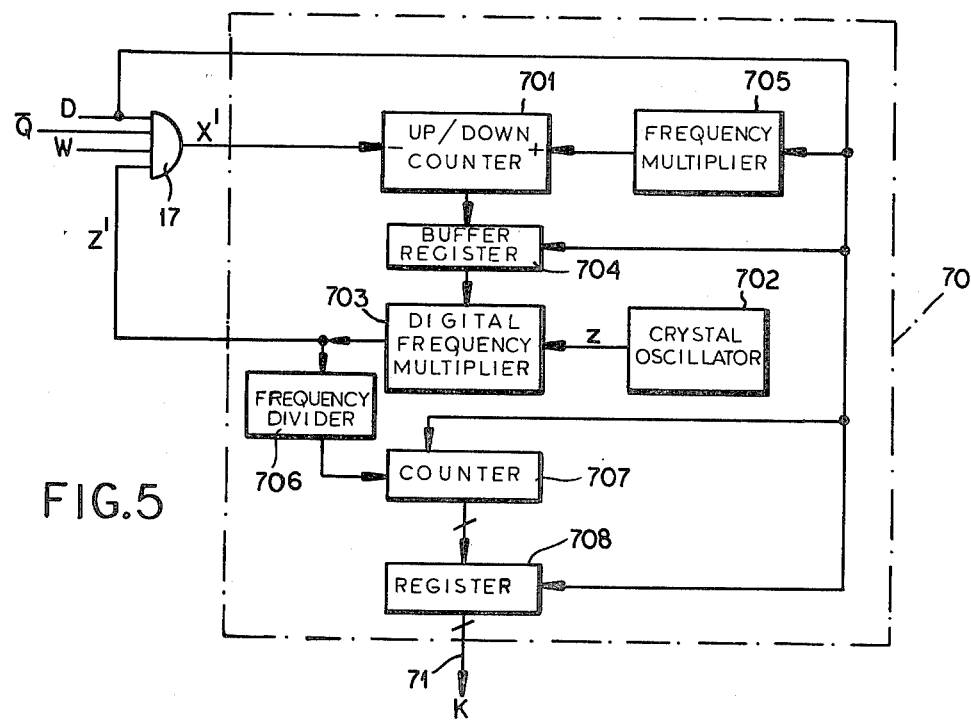
FIG. 5 illustrates another form of error corrector likewise providing quasi-continuous compensation.

FIG. 5 illustrates a modified counting-error corrector 70 including an up/down counter 701 which is stepped forward by control pulses D and stepped backward by pulses X' derived from test pulses Z' that are passed by gate 17. These test pulses are obtained from a train of clock pulses z of very stable frequency, generated by a crystal-controlled oscillator 702, with the aid of a digital frequency multiplier 703 whose multiplication ratio is controlled by the setting of the reversible counter 701 through the intermediary of a buffer register 704 read out by pulses D. A frequency multiplier 705 of fixed step-up ratio is inserted between the lead carrying pulses D and the forward-stepping input of counter 701; this multiplier may comprise, for example, a generator of a fixed number of consecutive stepping pulses triggered by any pulse D. A complementary frequency divider 706 feeds pulses Z' at a corresponding fraction of their cadence to a stepping input of a counter 707 which is reset and restarted by every control pulse D, after a transfer of its contents to a register 708. These contents, available at an output multiple 71 of register 708, constitute the corrective parameter K.

The corrector 70 is in a state of equilibrium when the number of forward-stepping pulses from multiplier 705, generated in response to each recognized detector pulse A, equals the number of cleared pulses X' occurring in a given gating interval G. In this case the instant cadence of test pulses Z' is K·S times the recurrence rate of control pulses D where S is the step-up factor of multiplier 705. Since divider 706 has a step-down ratio of 1:S, the number of pulses registered by counter 707 for each control pulse D represents the parameter K which is updated with every new pulse D. A slower updating rate, designed to increase the stability of the system, could be obtained by inserting a further frequency divider between the lead carrying pulses D and the unloading input of buffer register 704.

The parameter K extracted from register 708 can, of course, be used in the same way as in the case of error corrector 30 to increment the contents of an addressed cell of the memory 203 shown in FIG. 1.

Components 14-17 of FIG. 1 and 301-310 of FIG. 4 are, of course, representative of a variety of logic and arithmetic means that can be used to achieve the results described.

I claim:

1. A method of compensating for counting losses incurred in the operation of a pulse-height analyzer receiving output pulses of variable recurrence frequency from a radiation detector and including a memory with a multiplicity of cells selectively addressable by respective digitized amplitudes of said output pulses and loadable with incremental values representing a count of occurrences of a respective pulse amplitude during a given observation period, comprising the steps of:

(a) measuring a busy period which begins with an appearance of an output pulse of said radiation detector and ends with termination of processing of said output pulse by said analyzer;

(b) extending said busy period by an additional period corresponding to a predetermined rise time of any such output pulse, at least some of the busy periods so extended being separated by intervening gating intervals;

(c) generating a train of test pulses independent of said output pulses partly coinciding with said gating intervals, said test pulses having a basic frequency exceeding said recurrence frequency;

(d) determining a mean frequency of cleared test pulses coinciding with said gating intervals;

(e) determining the ratio of said basic frequency to said mean frequency; and (f) using said ratio as a corrective parameter in evaluating the counts of said occurrences.

2. The method defined in claim 1 wherein said ratio is used in step (f) as a weighting factor incrementing the count contained in a memory cell addressed by the digitized amplitude of any of said output pulses.

3. The method defined in claim 2 wherein said ratio is updated after every R cleared test pulses coinciding with said gating intervals, R being a predetermined number, by counting every $R^{th}$ test pulse generated during the intervening period.

4. The method defined in claim 3 wherein residual test pulses numbering less than R are accumulated in consecutive counting periods of R cleared test pulses to produce a carry added to the count of every $R^{th}$ generated test pulse.

5. The method defined in claim 2 wherein the basic frequency of the test pulses generated in step (c) is varied in response to changing differences between said mean frequency and the output-pulse frequency to maintain said basic frequency at a value at which the number of generated test pulses counted between consecutive output pulses constitutes said weighting factor.

6. A system for determining certain radiation characteristics in a field of radiant energy, comprising:

a detector disposed in said field for emitting output pulses of variable recurrence frequency and different amplitudes in response to incident radiation of different characteristics;

a pulse-height analyzer connected to said detector for receiving said output pulses therefrom, said analyzer including a memory with a multiplicity of cells and circuitry for selectively addressing said cells by digitized amplitudes of said output pulses;

a source of incremental values to be loaded into cells of said memory addressed by the digitized pulse amplitudes as a count of occurrences of a respective pulse amplitude;

timing means establishing a busy period which begins with an appearance of an output pulse of said detector and ends with termination of processing of said output pulse by said analyzer;

logic means connected to said timing means for extending said busy period by an additional period corresponding to a predetermined rise time of any of said output pulses and for establishing a gating interval intervening between busy periods so extended;

a generator of test pulses independent of said output pulses, having a basic frequency exceeding said recurrence frequency, said logic means including gate means connected to said generator for passing certain of said test pulses coinciding with said gating intervals, thereby providing a series of cleared test pulses of variable mean frequency; and arithmetic means connected to said generator and to said gate means for determining the ratio of the basic frequency of the test pulses emitted by said generator to the mean frequency of cleared test pulses passed by said gate means as a corrective parameter for an evaluation of the counts contained in the cells of said memory.

7. A system as defined in claim 6 wherein said source comprises a register connected to said arithmetic means for storing said corrective parameter as an incremental value to be loaded into the memory cell next addressed.

8. A system as defined in claim 7 wherein said arithmetic means comprises a pulse counter with a stepping input connected to said generator via a first frequency divider and with a resetting input connected to said gate means via a second frequency divider, each of said frequency dividers having a step-down ratio of 1:R whereby said pulse counter is advanced by every $R^{th}$ test pulse from said generator and is reset by every $R^{th}$ cleared test pulse passing said gate means, R being a predetermined number, the setting of said pulse counter being transferred immediately before any resetting thereof to said register as the integral part of said corrective parameter.

9. A system as defined in claim 8 wherein said first frequency divider comprises an ancillary counter resettable concurrently with said pulse counter, the setting of said ancillary counter immediately before any resetting thereof representing a fractional part of said corrective parameter, said arithmetic means further comprising adding means for summing the fractional parts read out from said ancillary counter prior to each resetting and for transmitting a resulting carry to said register to supplement said integral part.

10. A system as defined in claim 7 wherein said arithmetic means comprises an up/down counter with a forward-stepping input connected to said detector and with a backward-stepping input connected to said gate means, said generator being provided with a control input connected to said up/down counter for varying the basic frequency of said test pulses in response to differences between said mean frequency and the recurrence frequency of said output pulses in a manner maintaining said basic frequency at a value at which the number of test pulses generated between consecutive output pulses constitutes said corrective parameter, said register being connected to said generator via a pulse counter resettable by said output pulses.

11. A system as defined in claim 6 or 7 wherein an amplifier is inserted between said detector and said analyzer, said timing means including a threshold circuit connected to the output of said amplifier for signaling the start of a busy period in response to a rise in the output voltage of said amplifier above a predetermined noise level, said logic means including a monostable multivibrator with a triggering input connected to said timing means for measuring said additional period.

12. A system as defined in claim 11 wherein said analyzer includes a peak detector controlled by said timing means for sampling an incoming output pulse at the end of its rise time, said peak detector being deactivated by said timing means for the remainder of said busy period exclusive of said additional period.

* * * * *